United States Patent [19]

Oh et al.

[11] Patent Number: 4,939,399

[45] Date of Patent: Jul. 3, 1990

[54] SERIES-WOUND ELECTRICAL ROTATING FIELD MACHINE HAVING INTEGRATED RADIAL LOOP COILS AND DRUM COILS

[76] Inventors: Sang S. Oh; Jang K. Oh, both of 1404 Rene Rd., both of Villanova, Pa. 19085

[21] Appl. No.: 241,911

[22] Filed: Sep. 7, 1988

[51] Int. Cl.⁵ ............................................. H02K 3/00
[52] U.S. Cl. .................................... 310/198; 310/166; 310/184; 310/201; 310/207; 310/258; 310/261
[58] Field of Search ............... 310/198, 207, 179, 180, 310/181, 182, 183, 184, 177, 197, 198, 206, 201, 211, 212, 176, 46, 162, 166, 254, 261, 258, 89, 91, 205; 322/90

[56] References Cited

U.S. PATENT DOCUMENTS

| | | | |
|---|---|---|---|
| 2,296,776 | 9/1942 | Douglas | 310/212 |
| 2,758,228 | 8/1956 | Dunn et al. | 310/212 |
| 3,535,572 | 10/1970 | Derugeris | 310/207 |
| 3,705,459 | 12/1972 | Biddison | 310/207 |
| 4,270,065 | 5/1981 | Major | 310/207 |
| 4,692,647 | 9/1987 | Oh et al. | 310/212 |
| 4,716,329 | 12/1987 | Oh | 310/212 |

FOREIGN PATENT DOCUMENTS

| | | | |
|---|---|---|---|
| 0581871 | 10/1946 | United Kingdom | 310/207 |
| 0807967 | 1/1959 | United Kingdom | 310/212 |
| 1042225 | 9/1966 | United Kingdom | 310/212 |

*Primary Examiner*—R. Skudy
*Attorney, Agent, or Firm*—Ladas & Parry

[57] ABSTRACT

Radial loop coils are wound in radial planes partly in the conventional slots of the stator and/or rotor core at right angles to the planes of the conventional drum coils. No conventional drum coils are wound. A cylindrical body of nonmagnetic material is fixedly interposed between the rotor core and the shaft and/or between the stator core and the yoke so that the flux of the stator and the rotor core flows in opposite side portions of the stator and rotor core, not through the shaft or the yoke, to generate e.m.f. in the radial loop coils by the transformer action. The flux which is produced by the transformer m.m.f. of the radial loop coils is constrained to flow into the air gap by virtue of the presence of the cylindrical body of nonmagnetic material where it acts to eliminate changes in the main magnetic field flux density distribution in the air gap. The radial loop coils are connected in series at the surface of the stator and/or rotor cores to constitute drum coils and are also connected to the radial loop coils at 180° electrical degrees therefrom.

15 Claims, 10 Drawing Sheets

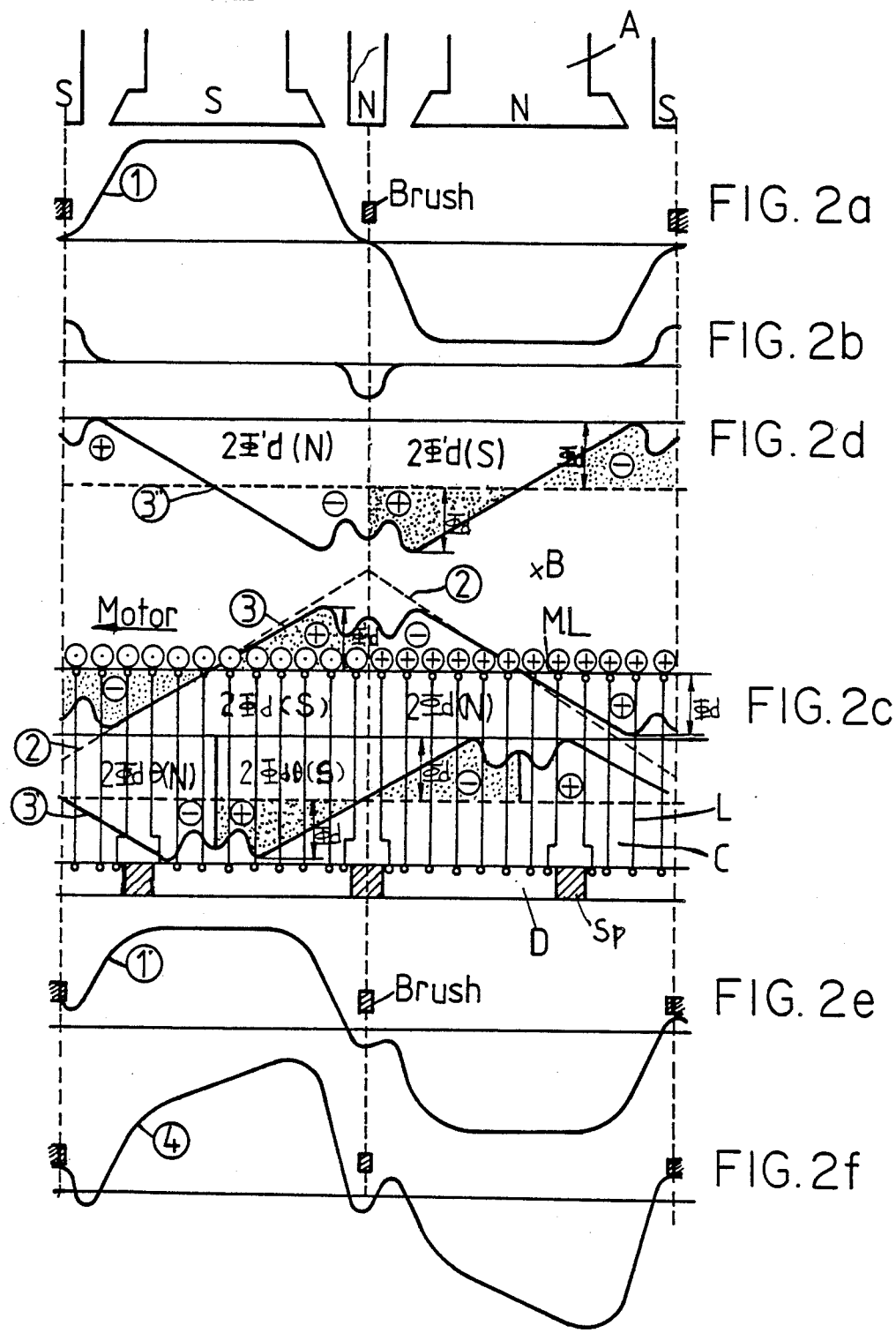

FIG. 4a
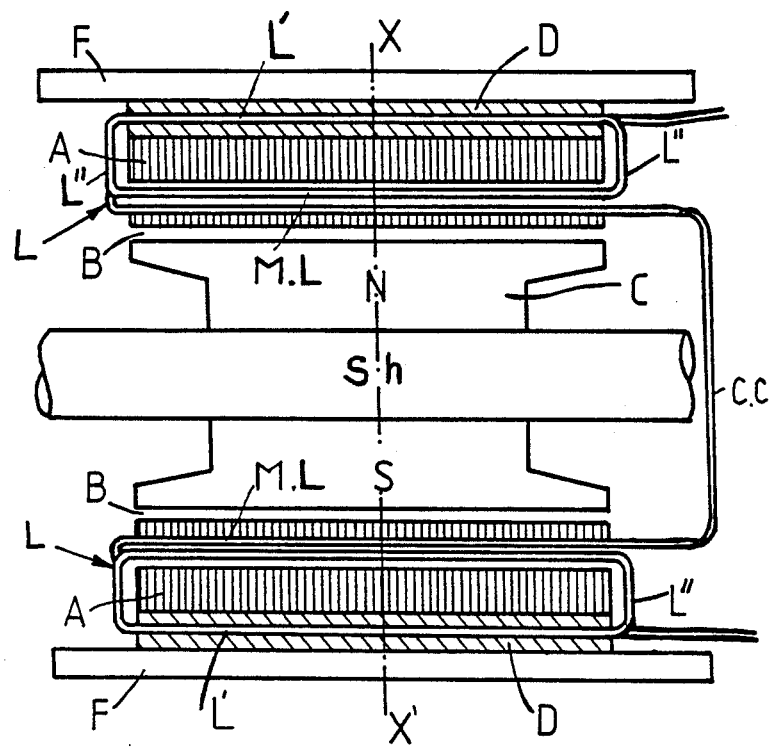
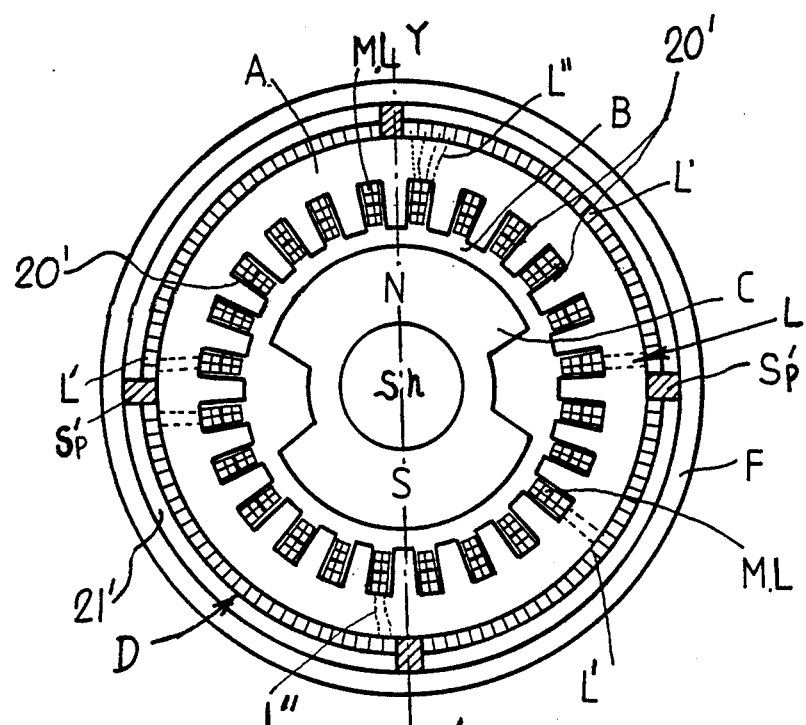
FIG. 4b

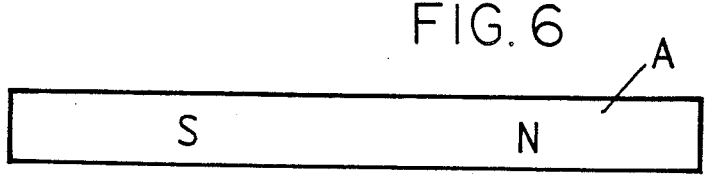
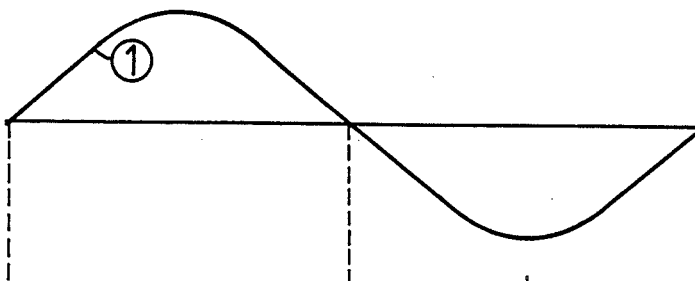
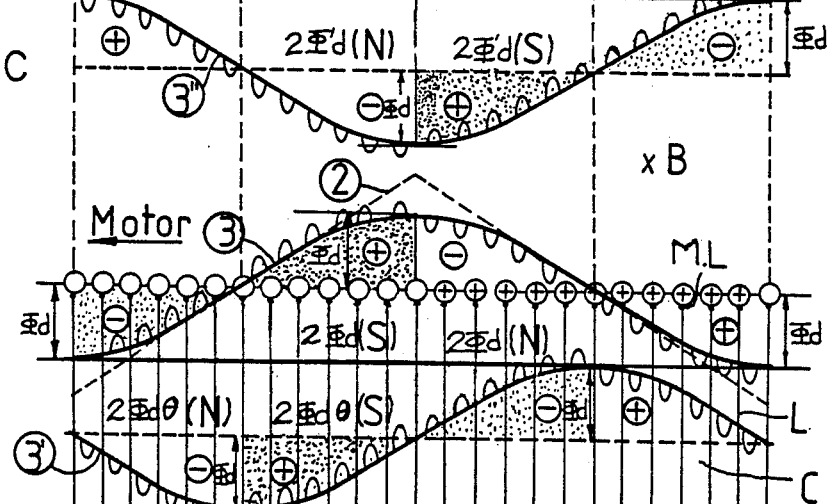
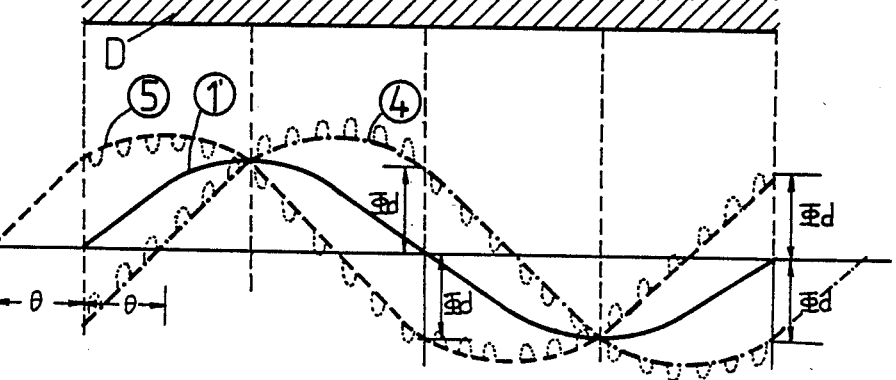

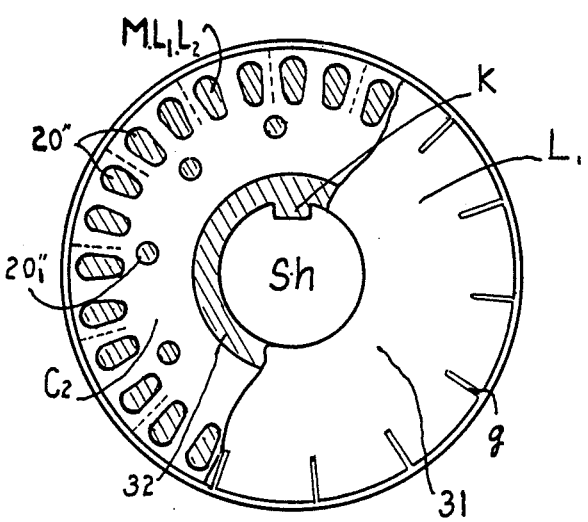
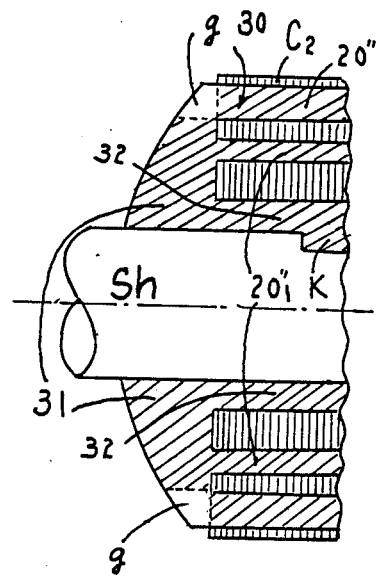
FIG. 7a
FIG. 7b
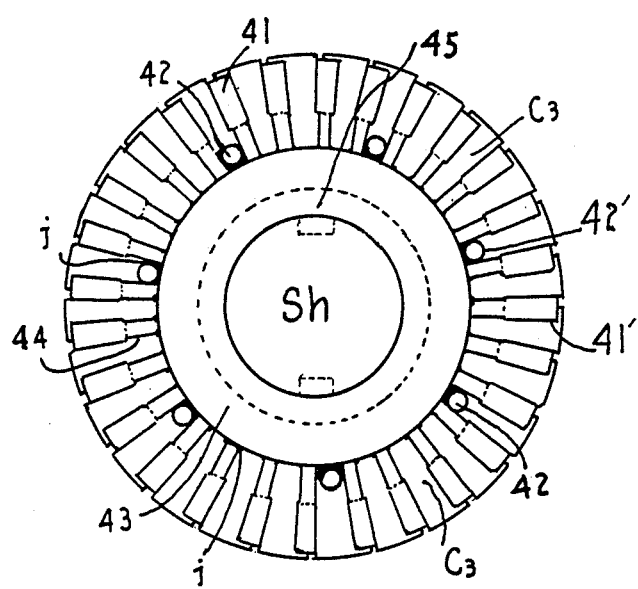
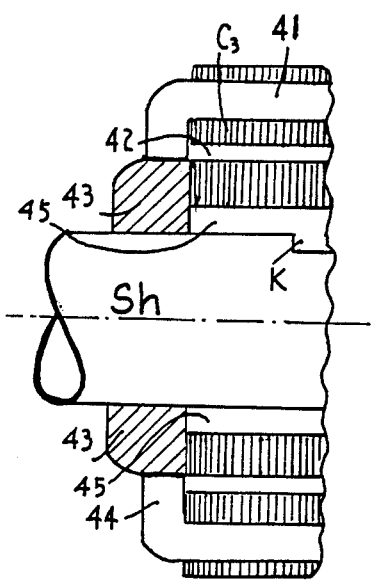
FIG. 7c
FIG. 7d

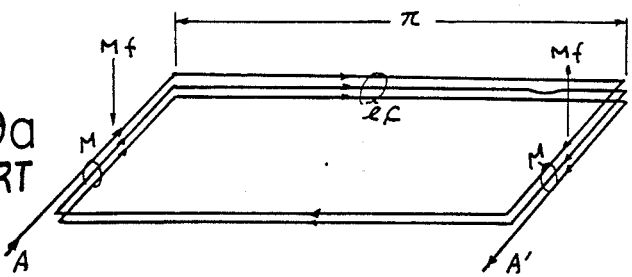
FIG. 9a
PRIOR ART
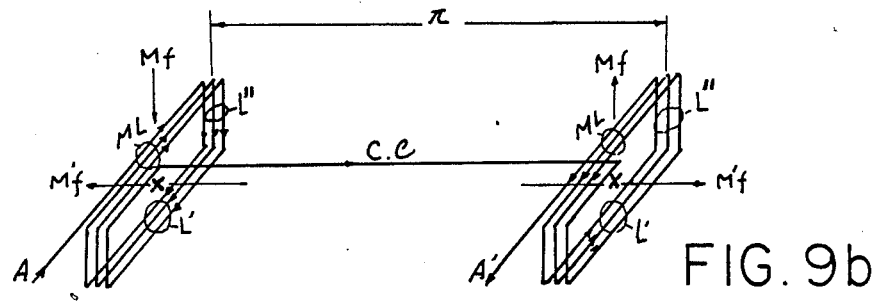
FIG. 9b
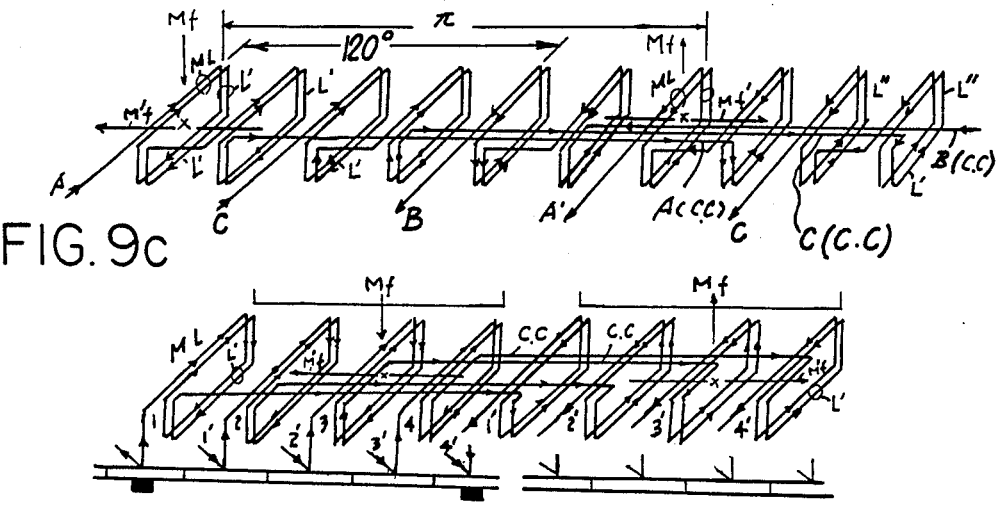
FIG. 9c
FIG. 9d
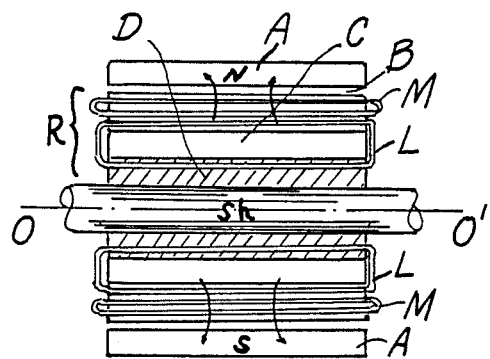
FIG. 10
PRIOR ART

SERIES-WOUND ELECTRICAL ROTATING FIELD MACHINE HAVING INTEGRATED RADIAL LOOP COILS AND DRUM COILS

FIELD OF THE INVENTION

This invention relates to an improved stator and/or rotor construction for an electric rotating field machine, such as a dynamo, to prevent certain undesirable effects which are inherent in the stator and/or rotor core of conventional electric machines.

More particularly, the invention relates to such construction which will neutralize change in the main field flux in the air gap of the dynamo due to armature reaction, leakage reactance and/or rotor reactance, and low-high pulsating flux.

BACKGROUND

When a conventional motor or generator, i.e. dynamo, is subjected to load, certain undesirable effects occur. For example, in D.C. or synchronous machines, armature reaction-leakage reactance is produced and in induction motors, rotor reactance is produced. These effects change both the magnitude and distribution of the flux crossing the air gap between the stator and rotor of such machines and adds vectorially to the main magnetic field flux, producing a resultant magnetic field flux which has a different distribution and intensity from the main magnetic field fluxes, causing phase and wave form distortions.

Thus, the electrical and magnetic neutral axis under load is shifted from the electrical and magnetic neutral axis at no load so that the effective magnetic field flux crossing the air gap is reduced and the induced e.m.f. in the armature or rotor conductors accordingly decreases, thus reducing the efficiency and performance characteristics of the rotating machine.

In our earlier patents 4,692,647 and 4,716,329, we have disclosed the provision of short-circuit ring coils and non-magnetic material to produce and position a counter flux for compensating distortions in the main flux in the air gap.

Referring to FIG. 10 which shows the construction of a dynamo according to our earlier patent 4,716,329 (FIG. 1'), the dynamo comprises a stator A constructed of magnetic material and having North and South poles N and S respectively, and a drum type rotor R secured to a shaft Sh which is rotatable about an axis O-O'. The stator A and rotor R form an air gap therebetween. A conventional main coil M is wound in external slots formed around the circumference of the rotor R. The main coil M is a drum winding, formed, for example, as a series winding around the periphery of the rotor. Also wound on the rotor are radial loop coils L which are separate from and do not interfere with the winding of the main coil M. The radial loop coils L are each of closed loop form and they extend in radial planes passing through axis O-O' at right angles to the main coil.

The rotor R includes a core C made of conventional magnetic materials such as silicon steel or low carbon steel. Interposed between the core C and shaft Sh is a cylindrical body D of nonmagnetic material such as stainless steel, aluminum, copper ally or the like. The body D of nonmagnetic material is fixed to the shaft Sh and to the rotor core C so that the entire rotor rotates around axis O-O'. The radial coils of closed loop form act to induce currents therein and produce flux which in combination with the nonmagnetic material of body D acts to produce a counterflux in the air gap to oppose the effects of leakage reactance and rotor reactance or armature reaction.

SUMMARY OF THE INVENTION

It is a primary object of the present invention to provide an electric rotating machine and particularly the fixed armature (stator) or' rotor therein which overcomes the undesirable featues and deficiencies associated with a conventional electric rotating machine as described above.

It is another object of the invention to provde improvements in the construction disclosed in our earlier patents which will simplify construction and improve the neutralization of the distortion of the main flux in the air gap thereby further improving efficiency as well as raising the power factor to approach unity.

It is another object of the present invention to provide an improved fixed armature (stator) or rotor which obviates operational problems arising from the fact that the change of the main magnetic field flux distribution crossing the air gap due to the armature reaction-leakage reactance of a D.C. or synchronous machine or rotor reactance of an induction motor, and the high-low pulsating flux increase as the load current of the armature or rotor conductor increases, thereby to attain a significant improvement in efficiency, starting and running performance over the conventional machine.

In accordance with the invention, there is provided an improved stator or rotor for use in the electric rotating machine in which only radial loop coils are wound in radial planes in either or both the stator and rotor core at right angles to the planes of the conventional drum coil winding and the radial loop coils are connected in series at the periphery of the rotor and/or stator and to radial loop coils located 180 electrical degrees therefrom.

In the invention, the radial loop coils are wound around the core of magnetic material of the rotor and/or stator and the radial loop coils have a first of their legs disposed in the conventional slots of the rotor and/or stator facing the air gap and a second of their legs parallel to the first leg in the vicinity of the nonmagnetic material.

Each radial loop coil can consist of a number of winding loops and one of the legs is connected to the leg of an adjacent radial loop coil while the other of the legs is connected to the radial loop coil located at 180 electrical degrees therefrom. The invention also contemplates the connection of a plurality of radial loop coils in series around the core before each radial loop coil is connected to the one located 180 electrical degrees therefrom. The connection line of the radial loop winding circuit at the radial ends of the core legs at 180 electrical degrees is referred to as the center coil or center ring as opposed to the end coil or end ring in the conventional machines.

In accordance with a further feature of the invention, no useless end coils exist as in conventional drum windings.

In further accordance with the invention, spiders which are made of structurally strong nonmagnetic metal (such as stainless steel) are fixedly secured to the rotor core and to the rotor shaft at three or four different places in the construction of a D.C. machine or induction motor, and to the fixed armature core (stator) and to the frame (yoke) in the synchronous machine to form an air space which constitutes the nonmagnetic material and in which the second legs of the radial loop coils are wound. In the induction motor, radial loop coils are also wound in radial planes and extend in the conventional slots of the stator core and the air space formed by the spider of nonmagnetic metal fixedly interposed between the frame (yoke) and the stator core. By this construction, in addition to the radial loop coils wound on the rotor core, a power factor approaching unity is obtained as well as substantial elimination of the rotor reactance.

According to the invention, a speed e.m.f. is generated in the radial loop coils due to placement of their legs in the conventional slots (which act as drum coils) by cutting the flux in the air gap and a transformer e.m.f. is generated in the entire circuit of the radial loop coils due to cutting the flux of the core of the rotor or stator on which the radial loop coils are wound. Therefore, the radial loop coil extending in part in the conventional slot of the rotor or stator core functions as the conventional drum coil and also as the common conductor of the radial loop coil and the conventional drum coil.

When the rotor is subject to load, the armature reaction-leakage reactance of a D.C. or synchronous machine and the rotor reactance of an induction motor is generated in the drum coils due to the load current. This armature reaction-leakage reactance or rotor reactance of the drum coil is neutralized and cancelled by the equal and opposite value of the armature reaction-leakage reactance or the rotor reactance of transformer e.m.f. induced in the radial loop coil so that the resultant field flux crossing the air gap becomes uniform and sinusoidal without phase and wave form distortions.

That is, the resultant field flux distribution under load coincides with the main field flux distribution at no load in the air gap so that the electrical or magnetic neutral axis is not shifted.

The effective field flux crossing the air gap and the induced (counter) e.m.f. of the fixed armature or rotor conductor are increased. The main field m.m.f. is at right angles to the plane of the armature or rotor m.m.f. and the power factor approaches unity.

Thus, the torque and the output are significantly increased.

The high frequency flux or harmonics produced in the air gap are also eliminated by the equal and opposite values of that of the transformer m.m.f. induced in the radial loop coil, without skewing of the stator or rotor slots, in the same way as the elimination of the armature reaction-leakage reactance or rotor reactance described above. Therefore, losses, heating, magnetic noise and deterioration of the insulation are greatly reduced.

The efficiency, temperature in the windings and the life of the insulation are accordingly improved. By using double radial loop windings instead of a single ring winding in the rotor core of an induction motor, higher efficiency as well as higher torque, particularly high starting torque, is obtained.

Any change of the main magnetic field flux density distribution in the air gap due to the load current can be eliminated by the effect of the radial loop coils in conjunction with the cylindrical body of nonmagnetic material. As a result of this improved stator and/or rotor construction, the starting and running performance is significantly improved in comparison with conventional electric rotating machines.

The invention together with further objects and advantages thereof will be better understood by referring to the following more detailed description taken in conjunction with the accompanying drawings.

BRIEF DESCRIPTION OF THE DRAWING

FIG. 2 shows in wave diagrams (a)–(f) the change of the main magnetic field flux density distribution due to armature reaction flux density in the air gap in a D.C. motor in accordance with the invention.

FIGS. 4a and 4b are diagrammatic longitudinal and transverse cross sectional views respectively of a rotating field synchronous generator.

FIG. 6 shows in wave diagrams (a)–(d) the changes of the main magnetic field flux density distribution due to the combined flux density of the rotor reactance and the high frequency or harmonics in an induction motor in accordance with the invention.

FIG. 7a is an end elevational view, partly broken away and in section of a squirrel cage rotor of an induction motor according to the invention.

FIG. 7b is a longitudinal section of an end portion of the rotor in FIG. 7a.

FIG. 7c is an end elevational view of another embodiment of a squirrel cage rotor of an induction motor.

FIG. 7d is a longitudinal section of an end portion of the rotor in FIG. 7c.

FIG. 9a is a schematic illustration showing the winding of drum coils in a conventional machine.

FIG. 9b is a schematic illustration showing the winding of two radial loop coils of a dynamo according to the invention.

FIG. 9c shows the stator winding of a three phase induction motor or synchronous machine in the manner of FIG. 9b.

FIG. 9d shows the armature winding of a D-C machine in the manner of FIG. 9b.

FIG. 10 is a longitudinal sectional view of an armature and the stator magnetic poles in an electric rotating machine as illustrated in Patent 4,716,329.

DETAILED DESCRIPTION OF PREFERRED EMBODIMENTS

The present invention is an improvement on the construction in our earlier patent and provides a simplified construction which not only improves the effects of the earlier construction and increases efficiency but it also raises the power factor of the dynamo so that it approaches unity.

In accordance with the present invention instead of providing radial loop coils of closed loop form which are short circuit windings and are separate from the drum windings of the main coil M, the windings of the invention comprise loop windings or coils L having one leg ML extending in a respective slot 20 (FIG. 3b) formed at the cylindrical surface of rotor core C, second legs L' extending parallel to legs ML and connected therewith by radial legs or end portions L". As shown in FIG. 9b the winding of the radial loop coils L can be effected continuously and each coil is connected in series, on the one hand with the next coil at the surface of the core C and on the other hand with the coil located 180 electrical degrees therefrom in the opposite direction. The connection line at the radial end of the core legs at 180 electrical degrees is referred to as the center coil (c.c.).

FIG. 9c shows the stator winding of a three phase induction motor or synchronous machine in the manner of FIG. 9b. Three successive loop windings are connected in series to form a loop coil L which in turn is series connected to the loop coil displaced by 180 electrical degrees and in turn formed by three series-connected loop windings.

FIG. 9d shows the armature winding of a D-C machine in the manner of FIG. 9b.

The effect of such radial loop coils L in dynamos constructed with nonmagnetic regions D will be explained hereafter. FIGS. 1a–1g illustrate the change of the main magnetic field flux density distribution in the air gap and armature (rotor) core and the effect of the radial loop coils in a D.C. machine in accordance with the invention.

Figure 1A:
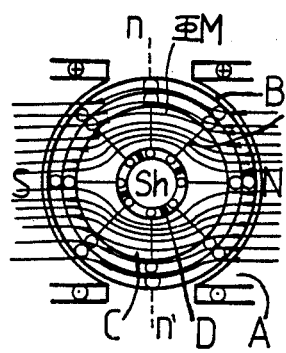
FIG. 1 at (a)–(g) illustrates the change of the main magnetic field flux density distribution in the air gap and the armature (rotor) core and the effect of the radial loop coil in a D.C. motor in accordance with the invention.

FIG. 1a illustrates the distribution of the main field flux density. The main magnetic field flux ($\phi M$) produced on the stator (A) is diverted by nonmagnetic body D to flow in laterally concentrated flux paths at upper and lower portions of the armature core (C) so that the main field flux ($\phi M$) uniformly cuts the radial loop coils in the upper and lower portions of the armature core.

Figure 1B:
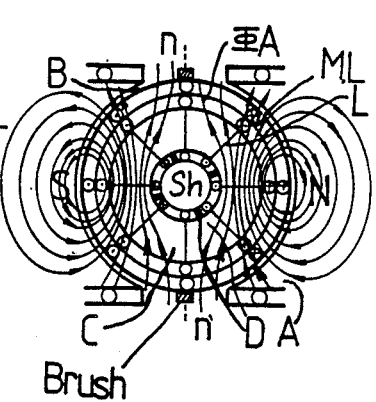

FIG. 1b illustrates the distribution of the flux density of the armature m.m.f. The flux ($\phi A$) of the armature m.m.f. uniformly cuts the radial loop coils at the left and right sides of the armature core (C) by virtue of the employment of the nonmagnetic material (D) between the armature core and the shaft.

Figure 1C:
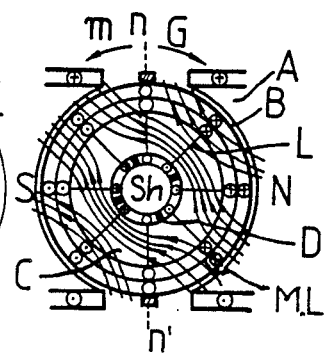

FIG. 1c illustrates the distribution of the resultant field flux density, produced by the resultant of the main field and the armature m.m.fs.

Figure 1D:
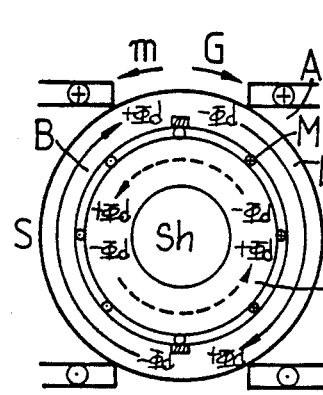

FIG. 1d illustrates the magnitude of the resultant field flux density distribution in the air gap and the armature core in a conventional D.C. machine. When the drum coils of the armature core carry current, the distribution of the flux density changes in the air gap (B) and the armature core (C) at the same time.

The flux density in the air gap across the pole face is no longer constant and increases over the upper half of the S pole and the lower half of the N pole (increased flux = $+\phi d$) and decreases over the lower half of the S pole and the upper half of the N pole (decreased flux = $-\phi d$).

At the same time, the flux density in the armature core is increased in the left upper half and the right lower half of the armature core (increased flux = $+\phi d$) and decreases in the other upper and lower halves of the armature core (decreased flux = $-\phi d$). The flux change in the air gap is in quadrature phase difference from the flux change in the armature core.

Figure 1E:
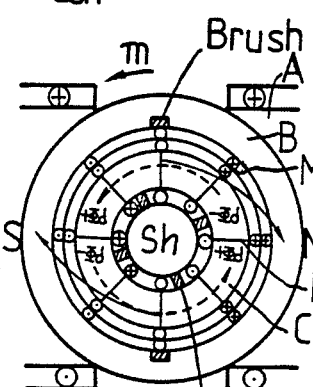
Figure 1F:
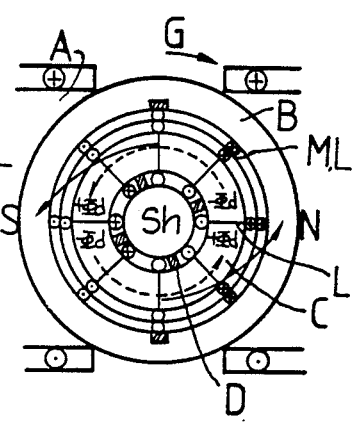

FIGS. 1(e) and (f) illustrate the effect of the radial loop coils in conjunction with the nonmagnetic material in a motor and generator respectively. The increased and decreased flux change ($+\phi d$ and $-\phi d$) in the armature core (C) cut the radial loop coils (L) to generate an e.m.f. by transformer action.

The flux (m.m.f.) of the transformer e.m.f. induced in the radial coils extends into the air gap (B) in a direction opposite to the rotation to cancel and neutralize the preexisting flux change in the air gap.

Figure 1G:
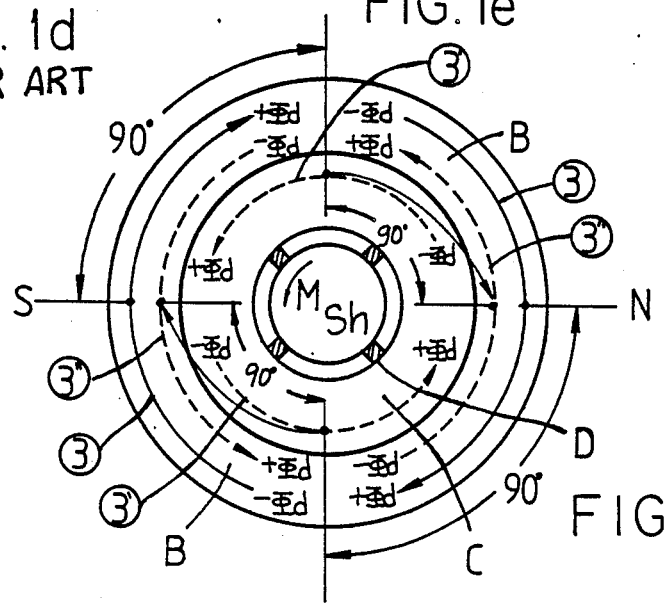

FIG. 1(g) illustrates the change of the flux density in the air gap and in the armature core and the effect of the radial loop coils in a D.C. motor in accordance with the invention.

When a D.C. motor is subjected to load, the flux change occurs in the air gap (B) and the armature core (C) at the same time.

The flux change 3 in the air gap is in quadrature phase difference with the flux change 3' in the armature core.

The flux change 3' in the armature core cuts the radial loop coils and generate e.m.f. in the radial loop coils by transformer action. The flux change 3" produced by transformer m.m.f. in the radial loop coils, travels to the air gap in a direction opposite to the rotation by virtue of employment of the nonmagnetic material (D). The flux change 3" eliminates the preexisting flux change 3 in the air gap becuase they are in 180 degree phase difference from each other.

This will be explained further with reference to the wave diagrams in FIGS. 2a–f wherein there is shown the change of the main field flux density distribution due to the armature reaction flux density in a D.C. motor in accordance with the invention.

FIG. 2(a) shows at curve 1 the distribution of the main field flux density in the air gap (B) at no load produced by the stator (A).

FIG. 2(b) illustrates the distribution of the flux density produced by an interpole interposed between the North and South poles of the stator A.

FIG. 2(c) illustrates the distribution of the armature reaction flux density in the air gap (B) and the armature core (C).

Curve 3 represents the distribution of the armature reaction flux change in the air gap (B) (total flux change: $2\phi d$ at each pole), produced by the armature m.m.f. (curve 2) in the legs ML of the radial loop coils, said legs serving as conventional drum windings or coils.

Curve 3' represents the distribution of the armature reaction flux change in the armature core (C) (total flux change: $2\phi d\theta$ in the upper or lower half of the armature core), which is at a 90 degree phase difference from the armature reaction flux change (curve 3) in the air gap.

The flux change (curve 3') of the armature reaction in the armature core cuts the radial loop coils (L) and generates e.m.f. in the radial loop coils by the transformer action.

The flux change produced by the transformer m.m.f. of the radial loop coil is shown at curve 3" and is 90° out of phase with flux change 3'. The flux change 3" is constrained to flow into the air gap (B) in the direction opposite to the rotation due to placement of the nonmagnetic material (D) around the shaft to cancel and neutralize the preexisting flux change of the armature reaction (3) in the air gap produced by the armature m.m.f. of the drum coil (M).

FIG. 2(d) illustrates the distribution of the armature reaction flux density (curve 3") produced by the transformer m.m.f. of the radial loop coil (L) (total flux change: $2\phi'$d at each pole), which has a 90 degree phase difference from the flux change of the armature reaction of the armature core (curve 3').

The flux change of the armature reaction (curve 3) produced by the armature m.m.f. of the drum coil is at a 180 degree phase difference from the flux change of the armature reaction (curve 3") produced by the transformer m.m.f. of the radial loop coils so that the armature reaction flux is eliminated in the air gap.

Therefore, the resultant field flux density distribution crossing the air gap becomes uniform and coincides with the main field flux density distribution at no load.

In FIG. 2(e), curve 1' illustrates the distribution of the resultant field flux density in the air gap of the D.C. motor according to the invention.

In FIG. 2(f), curve 4 illustrates the distribution of the resultant field flux density in the air gap of a conventional D.C. motor (curve 1+curve 3).

The commutation role is enlarged because of decrease of the reactance voltage. The induced e.m.f. (E) increases so that the speed (n) accordingly increases from the equation $n = E/\phi F$ ($\phi F$=main field flux density) and the ouput (P) also increases from the equation $P = E \times I = T \times n$ (I=current: T=torque).

The torque significantly increases because:

1. the armature m.m.f. increases due to decrease of the demagnetizing ampere-turns; and
2. the main field m.m.f. is at right angles to the plane of the armature m.m.f. due to elimination of the armature reaction.

Low and high pulsating flux is produced in the air gap by the stator poles and armature slots.

This pulsating flux in the air gap is cancelled and neutralized by the equal and opposite value of that of the transformer m.m.f. induced in the radial loop coils in the same way as elimination of the armature reaction as described above, so that losses, magnetic noise and temperature increase are reduced.

Thus, all the flux changes of the main field flux density crossing the air gap can be eliminated by virtue of the employment of the radial loop coils L and the nonmagnetic material D in the armature.

The presence of the interpole and equalizer and the compensating windings as used in conventional machines is not necessary because the flux density distribution of the air gap is uniform with no wave form distortion. The magnetic neutral axis undergoes no angular shift. This is especially significant for a DC machine in that in the manner of the winding diagram shown in FIG. 9d, radial loop coils can be wound on the stator (since there are no interpole, compensating or equalizer windings) in the manner illustrated for the synchronous machine in FIGS. 4a and 4b.

Figure 3A:
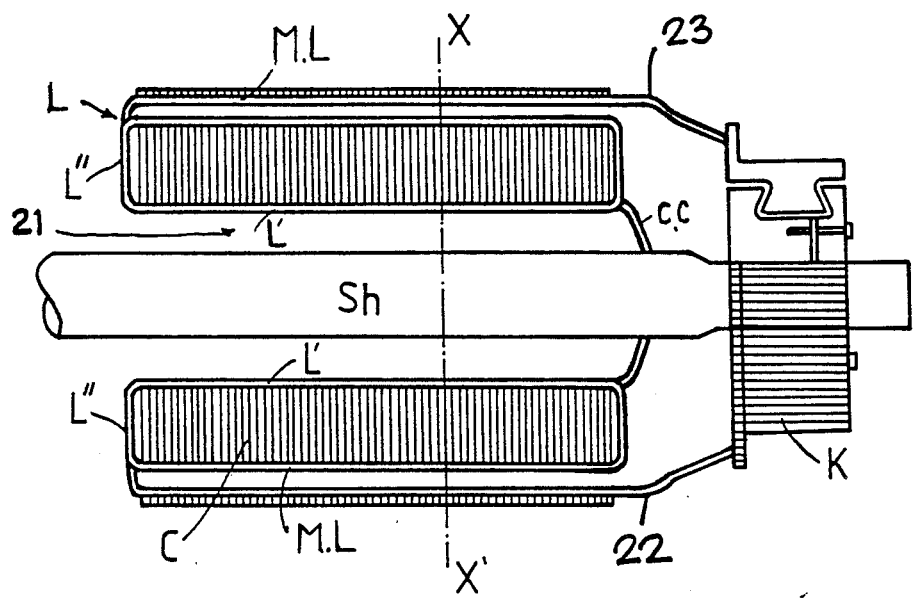
FIGS. 3a and 3b are diagrammatic longitudinal and transverse cross sectional views of the armature (rotor) respectively in a D.C. motor.
Figure 3B:
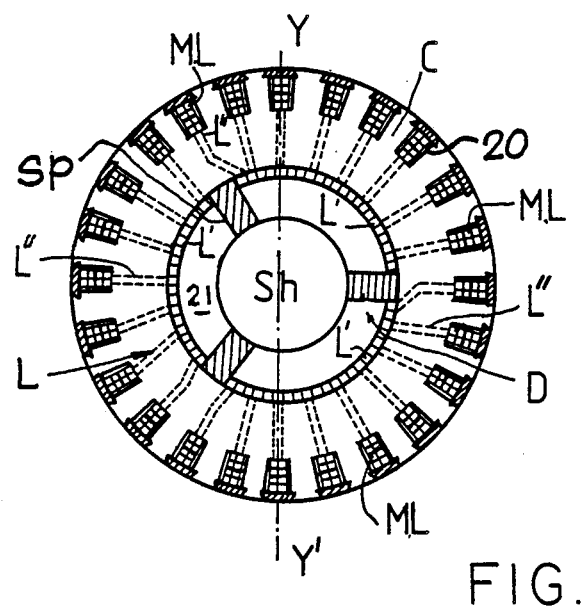

FIG. 3(a) is a longitudinal section view through the axis of rotation of the shaft of a D.C. motor according to the invention and FIG. 3(b) is a transverse cross sectional view in a plane perpendicular to the axis of rotation of the shaft. In FIGS. 3a and 3b, three radial spiders Sp of nonmagnetic material are secured to shaft Sh and rotor core C to form an airspace 21 between the rotor core C and the shaft Sh. The air space 21 and the spiders Sp collectively form the region of nonmagnetic material D.

The radial loop coils L are wound in radial planes in the D.C. motor. The legs ML of the radial loop coils L extend in the conventional slots 20 in the armature core C and legs L' extend in the air space 21. No conventional drum coils are wound. No skewing of the armature slots is necessary, The radial loop coils L are connected in series at 180 degree electrical angles in an opposite direction as shown in FIG. 9d and no conventional and useless end coils exist as in the case of conventional drum windings as shown in FIG. 9a.

An e.m.f. (hereafter referred to as a speed e.m.f.) is generated in legs ML of the radial loop coils which are placed within the conventional slots due to cutting the flux in the air gap and a transformer e.m.f. is generated in the entire circuit of the radial loop coils L due to cutting the flux of the armature (rotor) core C.

Therefore, the radial loop coils L placed in the conventional slots of the armature core function as a conventional drum coil to provide a dynamo function when legs ML cut the main field flux and also as a common conductor for the radial loop coils L and the conventional drum coil (M).

The ends of the connected radial loop coils L are finally connected by cables 22, 23 to a commutator K.

FIG. 4a is a longitudinal sectional view and FIG. 4b is a transverse cross sectional view through a rotating field synchronous generator in accordance with the invention.

In the synchronous generator of FIGS. 4a and 4b, the rotor is constituted by magnetic element C and the stator by the armature core A of magnetic material which is fixed to yoke F by four radial spiders Sp' made of nonmagnetic material. Air space 21' is formed between the yoke F and the armature core A (stator core) and the air space 21' and the spiders Sp' constitute the region D of nonmagnetic material. The radial loop coils L are wound in radial planes on the armature core A, such that the legs ML extend in the conventional slots 20' in the armature core A and the legs L' extend in the air space 21'.

The radial loop coils L are connected in series at 180 electrical degrees in the opposite direction as shown in FIG. 9C. No conventional and useless end coils exist.

The speed e.m.f. is generated in the legs ML placed within the conventional slots 20' due to cutting the flux in the air gap and the transformer e.m.f. is generated in the entire circuit of the radial loop coils due to cutting the flux of the fixed armature (stator) core.

Therefore, the radial loop coils function both as conventional drum coils (M) and as radial loop coils (L).

Figure 5A:
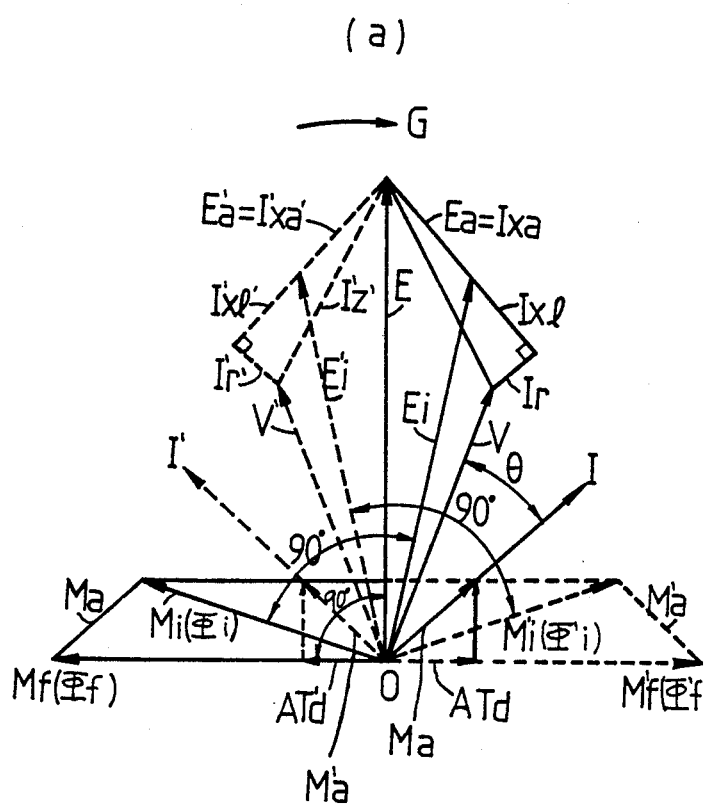
FIGS. 5a and 5b are vector diagrams of the electromotive and magneto motive forces of one phase of a synchronous generator in accordance with the invention.
Figure 5B:
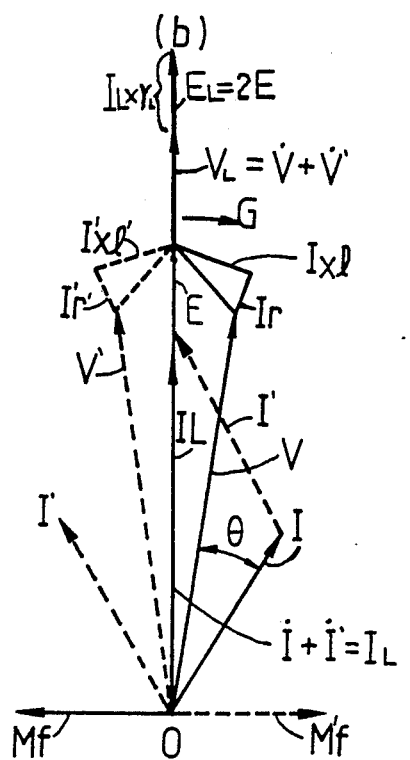

FIGS. 5a and 5b are vector diagrams of the electromotive forces and magnetomotive forces of one phase of a synchronous generator in accordance with the invention.

E is the e.m.f. generated in the legs ML (drum coil) of the radial loop coils L at no load due to cutting the main field flux ($\phi f$) in the air gap, produced by the field m.m.f. (Mf) acting alone. Mf is in quadrature behind E. Under load, the current (I) flows in the drum coils of the armature and generates m.m.f. (Ma) which is in phase with the current (I).

Ei is the e.m.f. generated in the drum coils of the armature by the rotation of the flux ($\phi i$) in the air gap, produced by the resultant of the main field m.m.f. (Mf) and the armature m.m.f. (Ma).

Ei is in quadrature ahead of the resultant m.m.f. (Mi). The difference between the e.m.f. (E) generated at no load and the e.m.f. (Ei) generated under load in the drum coils of the armature is the e.m.f. lost due to the armature reaction (armature reaction reactance drop: $Ea = Ixa$). $E - Ea = Ei$. The armature reacion reactance drop is in quadrature phase difference from the current (I).

The terminal voltage (V) in the drum coils is expressed by the following equation:

$$\dot{V} = \dot{E} - \dot{I}\{r + j(x1 + xa)\} \quad 1$$

wherein:
Xa=armature reaction reactance;
X1=leakage reactance; and
r=resistance.

The main field flux ($\phi f$) flows from the N pole to the S pole in the air gap and from the S pole to the N pole in the armature core so that they are at 180 degree phase difference from each other.

The e.m.f. (E) is generated in the radial loop coils at no load due to cutting the field flux ($\phi'f$) of the armature core produced by the field m.m.f. (M'f) by transformer action.

This transformer e.m.f. (E) generated in the radial loop coils due to cutting the main field of flux of the armature core is in phase with the speed e.m.f. (E) generated in the drums coils due to cutting the main field of flux in the air gap. Since the flux in the air gap is equal to the value of the flux in the armature core and the same windings are being cut by the two fluxes, the magnitude of the speed e.m.f. and of the transformer e.m.f. will be equal.

Under load, the current (I') flows in the radial loop coils of the armature and produces the m.m.f. (M'a) which is in phase with the current (I').

The resultant flux ($\phi'i$) is produced by the resultant of the armature m.m.f. (M'a) and the field m.m.f. (M'f).

E'i is generated in the radial loop coils by the resultant flux ($\phi'i$) of the armature core due to transformer action.

E'i is in quadrature phase difference with the resultant flux ($\phi'i$) in the armature core.

The difference between the e.m.f. (E) generated at no load and the e.m.f. (E'i) generated under load in the radial loop coils is the e.m.f. lost due to the armature reaction (the armature reaction reactance drop: $\dot{E}'a = \dot{I}'xa'$). $\dot{E} - \dot{E}'a = \dot{E}'i$ The armature reaction reactance drop is in quadrature phase difference with the current (I').

The terminal voltage in the radial loop coils is expressed by the following equation:

$$\dot{V}' = \dot{E} - \dot{I}'\{r' + j(x1' + xa')\} \quad 2$$

wherein:
armature reaction reactance=xa';
leakage reactance=x1'; and
resistance=r'.

The armature reaction reactance drop (Ea) and leakage reactance drop (Ix1) of the drum coil are eliminated and neutralized by the equal and opposite values in the radial loop coils.

That is, $$\dot{E}a - \dot{E}'a = 0,$$

$$\dot{I}x1 - \dot{I}'x1' = 0.$$

Thus, the terminal voltage in the machine of the invention follows from equations 1 and 2 as follows:

$$\dot{V}L = \dot{V} + \dot{V}' = \dot{E}L - \dot{I}L \times rL$$

$$\dot{E}L = 2\dot{E} \text{ and } rL = r + r'$$

Hence, only line resistance drop (IL×rL) remains, which is the sum of the resistance drops of the drum coils (Ir) and the radial loop coils (I'r'). Thus, the line terminal voltage is the difference between the line induced e.m.f. (EL) and the line resistance drop (IL×rL).

The terminal voltage and the output thus increase because of the elimination of the synchronous reactance (armature reaction and leakage reactance). The vector resultant of the terminal voltages ($\dot{V}L = \dot{V} + \dot{V}'$) of the radial loop and drum coils is in phase with the vector resultant of the currents ($\dot{I}L = \dot{I} + \dot{I}'$) of the radial loop and drum coils regardless of the load change so that the power factor becomes unity as seen in FIG. 5b where VL is in phase with IL. No shift is therefore produced of the electrical and magnetic neutral axis.

FIGS. 6a–6d are wave diagrams showing the change of the main field flux density distribution due to the combined flux density of the rotor reactance and high frequency (or harmonics) in an induction motor in accordance with the invention.

FIG. 6(a) illustrates the distribution of the main field flux density in the air gap at no load, produced from the stator (A).

FIGS. 6(b) and (c) illustrate the distribution of the combined flux density of the rotor reactance and the high frequency (or harmonics) in the air gap (B) and rotor core (C) and the effect of the radial loop coils (L).

Curve 2 is the distribution of the rotor m.m.f. induced in the legs ML serving as the drum coils.

Curve 3 is the distribution of the rotor reactance flux density produced by the rotor m.m.f. (curve 2) of the drum coil, combined with the high frequency (or harmonics) in the air gap B. The total flux change=2$\phi$d in each pole.

Curve 3' is the distribution of the combined flux density of the rotor reactance and the high frequency (or harmonics) in the rotor core C. The total flux change=2$\phi$d$\theta$ in the upper or lower half of the rotor core. This curve is in quadrature phase difference from the curve 3.

Curve 3'' is the distribution of the combined flux density of the rotor reactance and the high frequency (or harmonics) in the air gap produced by the transformer m.m.f. induced in the radial loop coils L. The total flux change=2$\phi'$d in each pole. This curve is in quadrature phase difference from the curve 3'. The combined flux of the rotor reactance and the high frequency (or harmonics) flows in the rotor core and cuts the radial loop coils to generate e.m.f. by transformer action. The combined flux (curve 3'') produced by the transformer m.m.f. of the radial loop coils travels to the air gap in the direction opposite to the rotation by virtue of placement of the cylindrical body of nonmagnetic material (D) between the shaft and the rotor core C to cancel and neutralize the preexisting combined flux (curve 3) of the air gap because curve 3'' is in 180 degree phase difference with the curve 3. FIG. 6(d) illustrates the distribution of the resultant field flux density in the air gap.

Curve 4 is the distribution of the resultant field flux density in the air gap, produced by the resultant m.m.f. of the drum coils (the resultant of curve 1 and curve 3).

Curve 5 is the distribution of the resultant field flux density in the air gap, produced by the resultant m.m.f. of the radial loop coils (the resultant of curve 1 and curve 3'').

Curve 1' is the distribution of the resultant field flux density in the air gap in the induction motor of the invention (one-half the resultant of curves 4 and 5).

Therefore, the distribution of the resultant field flux density in the air gap (curve 1') is uniform and sinusoidal without phase angle ($\theta$) and wave form distortion.

FIGS. 7a and 7b show an induction motor according to the invention in which the radial coils are integrally cast with the region of nonmagnetic material as an aluminum die casting 30. In this respect, rotor core C2 made of magnetic material is formed with main slots 20" near the cylindrical surface thereof and second slots $20_1$" radially inwards of slots 20" but proximate thereto. The aluminum die casting 30 fills the slots 20", $20_1$" and the space 32 between the rotor core $C_2$ and the shaft Sh to constitute the legs of the windings in the rotor. The casting 30 also form a center ring 31 at each radial end of the rotor core which connects the windings to the region of nonmagnetic material 32 interposed between the rotor core and shaft which is rotatably secured at a keyway K to the shaft Sh. A plurality of radial slits q are formed at the periphery of the rotor core C2 and extend radially inwards approximately to the depth of the slots 20". The slits g remain empty. The center rings 31 at each radial end substantially increase in thickness as they approach the shaft in order to reduce the electrical resistance.

The impedance of the drum winding circuit is made to approach that of the radial loop winding circuit by cutting the drum winding circuit (slits g) at the periphery of the center ring 31 of the rotor core so that the efficiency and the torque, particularly the starting torque increase. The slits (g) block circumferential current flow at the center ring of the rotor and make the current flow centripetally toward the center ring 31. Thereby, there is an equilibration of the vectors of the radial loop and drum winding circuits as in FIG. 5a so as to provide a power factor of unity.

FIG. 7c is an end elevational view of another embodiment of the present invention of a squirrel cage rotor for an induction motor utilizing nonmagnetic electrically conductive bars. The nonmagnetic electrically conducting metallic bars 41 (such as copper bars) are embedded in first main slots 41' and nonmagnetic electrically conducting bars are embedded in second slots 42' in the rotor core C3. The bars 42 are fewer in number than the bars 41 and are smaller in cross section. A nonmagnetic electrically conductive metallic ring 43 (center ring) is placed at each radial end of the rotor core. A nonmagnetic electrically conductive metallic cylindrical plate 45 is mechanically secured and fixed to the rotor core C3 and the shaft Sh. The nonmagnetic electrically conductive metallic plate 45 can be cast into an air space formed by nonmagnetic metallic spiders fixed to the shaft and the axial ends of the rotor core at three or four different places in a large squirrel cage rotor. The nonmagnetic electrically conductive metallic bars 41 embedded in the main slots extend radially inwards at each end of the rotor core at lugs 44 which are welded at their inner ends to the nonmagnetic electrically conductive metallic ring 43 (center ring) which is also welded (j) to the nonmagnetic electrically conductive metallic plates 45 (copper).

The nonmagnetic electrically conductive metallic bars 42 embedded in the second slots are welded to the radial lugs 44 of the nonmagnetic electrically conductive metal as well as the center ring 43. Therefore, the nonmagnetic electrically conductive metallic bars embedded in the main and second slots, the nonmagnetic electrically conducting metallic center rings 43 at each radial end, the nonmagnetic electrically conductive metallic plate 45 interposed between the rotor core and shaft and the nonmagnetic electrically conductive metallic lugs 44 are all interconnected with each other. A first radial loop circuit is formed by bars 41 as a main winding in a radial plane through the nonmagnetic electrical conductors placed in the first slots 41' and the plate 45 in the space between the rotor core and the shaft. A second radial loop circuit is formed in a radial plane through the nonmagnetic electrical conductors 41 and 42. The speed e.m.f. is generated in the winding 41 placed in the first slot (main slot) due to cutting the flux of the air gap (so called drum winding).

The transformer e.m.f. is generated in the first and second radial loop windings due to cutting the flux of the rotor core. Thus, the winding positioned in the main slot can be a common conductor of the drum winding as well as the double radial loop winding. The double radial loop windings are provided to obtain increase of efficiency as well as increase of the torque, particularly the starting torque.

The feature of the center ring in the squirrel cage rotor of an induction motor is very significant (as opposed to the end rings of a conventional rotor) because the resistance is reduced and the current in the radial loop and drum winding circuits flow centripetally through the center ring. In FIGS. 7a and 7b, the central ring of the die cast squirrel cage motor is formed by the entire end portions of the rotor core. In FIGS. 7c and 7d the center ring of the squirrel cage rotor utilizes the copper bars. In assembly, the copper central ring 43 is introduced at the radial end of a rotor core on the shaft and welded to the lugs 44 of the copper bars in the main slots, and to the copper bars 42 as well as copper plates 45.

Figure 7E:
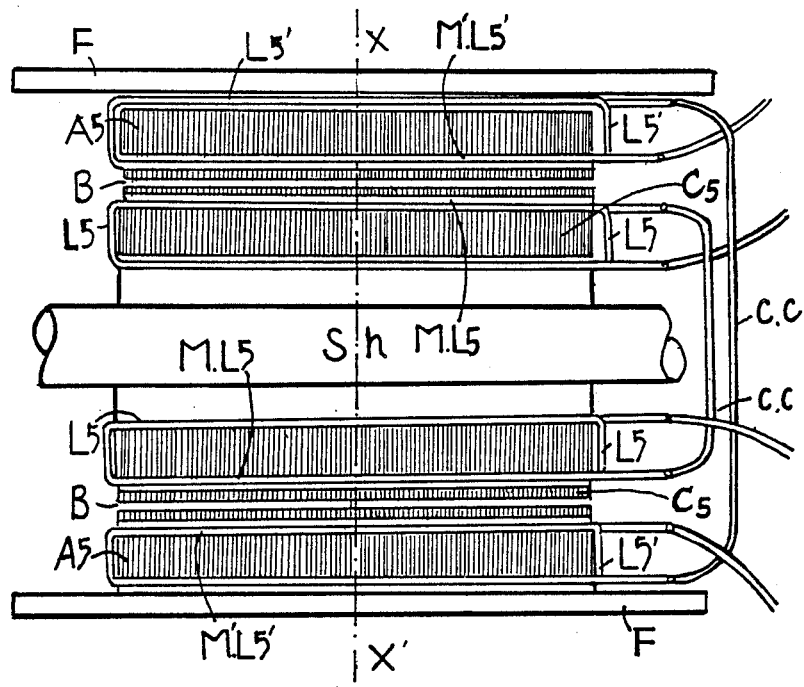
FIGS. 7e and 7f are longitudinal and transverse cross sectional views respectively of the wound rotor and the stator of an induction motor according to the invention.
Figure 7F:
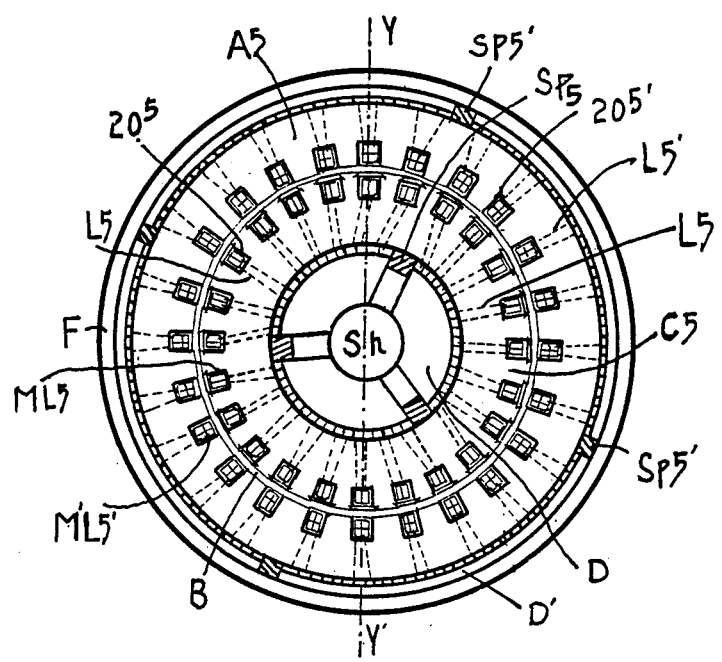

FIGS. 7e and 7f are respective longitudinal and transverse sectional views of an embodiment of an induction motor which employs windings rather than the die cast body as in the embodiment of FIGS. 7a and 7b or the bars in the embodiment of FIGS. 7c and 7d.

In FIGS. 7e and 7f radial loop coils L5 are wound in radial planes on the rotor core C5 and radial loop coils L5' are wound in radial planes on the stator core A5. The rotor core C5 is secured by three nonmagnetic metallic spiders Sp5 to shaft Sh and the stator A5 is secured to yoke F by four spiders Sp5'. The radial loop coils L5 extend in slots $20^5$ formed in the surface of the rotor core C5 facing air gap B and in the air space (D) formed between the rotor core C5 and the shaft Sh. The radial loop coils L5' extend in slots $20^{5'}$ formed in the surface of the stator core A5 facing air gap B and in the air space (D') formed between the stator core A5 and yoke F. The radial loop coils on the rotor core and the radial loop coils on the stator core are respectively connected in each core in series at 180 electrical degrees as previously explained.

The speed e.m.f. is generated in the legs of the coils positioned in the conventional slots in the rotor core as well as in the stator core due to cutting the flux in the air gap B and the transformer e.m.f. is generated in the radial loop coils L5 and L5' due to cutting the flux of the rotor core and the stator core. Therefore, the legs of the coils placed in the conventional slots in the rotor core and the stator core serve as a common conductor of the drum coil as well as the radial loop coil (M.L5 in the rotor core and M'.L5' in the stator core).

FIG. 8 is a vector diagram of the electromotive and magnetomotive forces of one phase of the rotating field induction machine in accordance with the invention in which the rotor reactance is neutralized. Namely, the rotor reactance drop in the drum coil is cancelled and neutralized by the equal and opposite value of the transformer rotor reactance drop in the radial loop coil on the rotor as described in FIG. 6 so that the vector resultant (I2L) of the load currents in the drum coil (I2) and radial loop coil (I'2) is in phase with the vector resultant (E2L=2E2) of the induced (counter) e.m.f. (E2) generated at no load in the drum coil and radial loop coil. Thus, the power factor (cos $\theta 2$) of the rotor becomes unity. Only line resistance drop (I2L×r2L) which is the sum of the resistance drops of the drum coil and the radial loop coil remains in the rotor. That is, E2L-=I2L×r2L/S (S=slip) and r2L+r2'. The induced e.m.f. (E2) generated at no load is equal to the sum of the induced e.m.f. generated under load and the line resistance drop. The rotor current (I2) decreases so that the slip decreases.

In the vector diagram of the stator, E1 is the e.m.f. generated (speed e.m.f.) in the drum coil at no load due to cutting the main field flux ($\phi f$) in the air gap or the transformer e.m.f. generated in the radial loop coil due to cutting the main field flux ($\phi' f$) of the stator core.

The speed e.m.f. of the drum coil is in phase with the transformer e.m.f. of the radial loop coil at no load. The magnitude of the speed e.m.f. and of the transformer e.m.f. will be equal.

When input current flows in the drum coil (I1) and the radial loop coil (I'1), they product m.m.f. in the drum coil (Ma) and m.m.f. in the radial loop coil (M'a) in the same direction as the corresponding current. The resultant field flux $\phi i$ is produced by the resultant of the drum coil m.m.f. (Ma) and the field m.m.f. (Mf), which is in quadrature phase difference from the input voltage (V1) of the drum coil. The resultant field flux $\phi' i$ is produced by the resultant of the radial loop coil m.m.f. (M'a) and the field m.m.f. (M'f), which is in quadrature phase difference with the input voltage (V'1) of the radial loop coil.

The leakage reactance drop (I1×1) of the drum coil is cancelled and neutralized by the equal and opposite value of the leakage reactance drop (I'1×'1) of the radial loop coil.

That is, $$\dot{I}1\times 1 - \dot{I}'1\times'1 = 0.$$

There is only one line resistance drop (I1L×r1L): I1L=İ+İ' and R1L=r°r') remaining in the stator, which is the sum of the resistance drops in the drum coil (I1r) and the radial loop coil (I'1r').

The total induced (counter) e.m.f. (E1L) is equal to the sum of the induced e.m.f.s in the drum coil and the radial loop coil (E1L=2E1).

The total input voltage (V1L) is equal to the sum of the input voltages of the drum coil and the radial loop coil ($\dot{V}1L = \dot{V}1 - \dot{V}'1$).

Therefore $$\dot{V}1L = \dot{E}1L + \dot{I}1L \times r1L$$

That is, the total input voltage is the sum of the total induced e.m.f. and the line resistance drop.

More importantly, the vector resultant (I1L) of the input currents of the drum coil and the radial loop coil is in phase with the vector resultant (V1L) of the input voltage of the drum coil and radial loop coil so that the power factor (cos $\theta 1$) of the stator becomes unity.

The input current decreases because of the elimination of the rotor reactance drop of the rotor and the leakage reactance drop of the stator. Thus the efficiency is greatly improved.

The torque and output also significantly increase because:

1. the main field m.m.f. (Mf) is perpendicular to the direction of the rotor m.m.f. (Ma);
2. the power factor of the rotor and stator is unity; and
3. the increase of the rotor m.m.f. due to the elimination of the demagnetizing ampere-turns (ATd−AT'd=O).

The starting torque substantially increases in spite of the decrease of the starting current in comparison with the conventional motor.

Figures 8A, 8B:
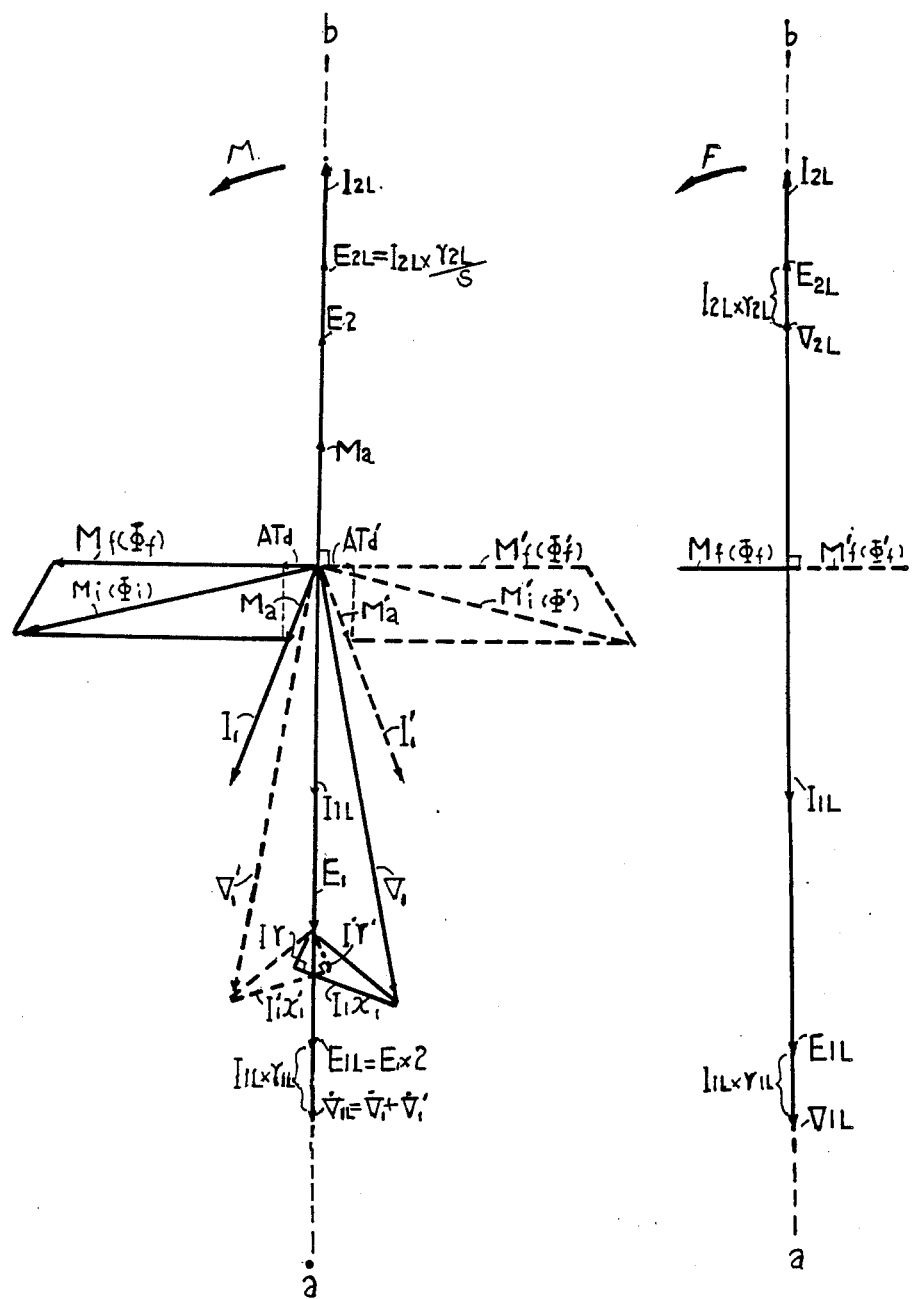
FIGS. 8a and 8b are vector diagrams of the electromotive and magneto motive forces of one phase of a rotating field induction machine in accordance with the invention.

FIG. 8(b) is a vector diagram of the primary and secondary after elimination of the leakage reactance of the transformer in the rotating field. The winding of the primary and the secondary in the transformer is the same as in the induction motor as described in FIGS. 7e and f. The leakage reactance of the drum coil is cancelled and neutralized by the equal and opposite values of that of the radial loop coil in the primary as well as in the secondary. V1L is the input terminal voltage of the primary. E1L is the resultant induced voltage of the drum coil and radial loop coil in the primary.

There is only line resistance drop (I1L×r1L) remaining in the primary, which is the sum of the resistance drops of the drum coil and the radial loop coil as in FIG. 8a.

Therefore, $\dot{E}1L = \dot{V}1L - (I1L \times r1L)$ where I1L=Load current in the primary.

E2L is the resultant induced voltage of the drum coil and radial loop coil in the secondary. There is only line resistance drop (I2L×r2L) remaining in the secondary, which is the sum of the resistance drops of the drum coil and radial coil. V2L is the total output terminal voltage of the drum coil and radial loop coil in the secondary.

Therefore, $\dot{V}2L = \dot{E}1L\, 1 - (\dot{I}2L \times r2L)$, wherein I2L is Load current in the secondary.

What is claimed is:

1. An electrical dynamo comprising a stator and a rotor constituted as concentric cylindrical members forming an annular air gap therebetween, said rotor being rotatable relative to said stator, a first of said cylindrical members being a magnetized member having North and South poles to provide a main flux field and form a magnetic circuit through the rotor and stator, one of said cylindrical members having a cylindrical surface bounding said air gap and being provided with slots in the vicinity of said air gap, said one of said cylindrical members including an annular region of non-magnetic material which opposes passage of magnetic flux therethrough and thereby alters said main field flux produced by the magnetized member, and a plurality of windings on at least one of said cylindrical members for cutting the main flux field during relative movement of the rotor and stator, said windings comprising a succession of radial loop windings connected in series to one another at the surface of said one member and to the radial loop windings located 180 electrical degrees therefrom, each radial loop winding having one leg extending in a respective slot, opposite radial end portions and a second leg in said slot radially displaced from said one leg, said windings further comprising connection lengths effecting connection of said radial loop windings in series at 180° electrical degrees from one another at one of the opposite radial end portions of said radial loop windings, said radial loop windings being operative to provide a dynamo function by said one legs of said radial loop windings cutting the main flux field and concurrently being operative in combination with said non-magnetic material for generating and positioning a counter flux in said air gap to neutralize change of the main field flux in said air gap due to armature reaction, leakage reactance and rotor reactance and low-high pulsating flux.

2. A dynamo as claimed in claim 1 wherein said annular region of non-magnetic material is cylindrical.

3. A dynamo as claimed in claim 1 wherein said rotor includes a rotatable shaft and a rotor core of magnetic material secured to said shaft, said annular region of nonmagnetic material being interposed between said shaft and said rotor core, said radial loop windings being on said rotor core.

4. A dynamo as claimed in claim 3 comprising nonmagnetic metallic spiders securing said rotor core to said shaft to form an air space therebetween, said spiders and said air space constituting said region of nonmagnetic material, said second legs of said radial loop windings extending in said air space.

5. A dynamo as claimed in claim 1 comprising a yoke, said stator including nonmagnetic metallic spiders securing said stator to said yoke to form an air space therebetween, said spiders and said air space constituting said region of nonmagnetic material, said second legs of said radial loop windings extending in said air space.

6. A dynamo as claimed in claim 1 constructed as a rotating field induction machine wherein said stator surrounds said rotor, said stator is said magnetized member, both said rotor and stator having cylindrical surfaces bounding said air gap provided with slots, said plurality of radial loop windings being wound on said stator and said rotor, said rotor and said stator each including a respective region of nonmagnetic material associated with the respective radial loop windings.

7. A dynamo as claimed in claim 6 wherein said windings and said connection lengths are integrated and formed as a unitary body with said nonmagnetic electrically conductive material, said rotor including a rotor core of magnetic material which is integrated with said unitary body, said rotor core having ends and being provided with radial slits at said ends between adjacent main slots.

8. A dynamo as claimed in claim 7 wherein said radial slits extend radially inwards from the cylindrical surface of the rotor bounding said air gap.

9. A dynamo as claimed in claim 8 comprising bars located radially inwards of said one legs of said windings and being fewer in number there than and smaller in cross-sectional area.

10. A dynamo as claimed in claim 1 constructed as an induction motor wherein said stator surrounds said rotor, said stator is said magnetized member, said rotor includes a rotor core of magnetic material and a rotor shaft, said region of nonmagnetic material is interposed between and secures said rotor core and said shaft and is made of electrically conductive material, said rotor core is provided with said slots, said one legs of the loop windings are constituted as bars of nonmagnetic electrically conductive material disposed in said slots, said radial end portions of the nonmagnetic electrically conductive material are connected to said bars and to the nonmagnetic electrically conductive plates interposed in said air space of said region of nonmagnetic material.

11. A dynamo as claimed in claim 10 wherein said region of nonmagnetic material includes an air space and nonmagnetic electrically conductive plates interposed in said air space, said bars being connected to said plates.

12. A dynamo as claimed in claim 11 wherein said radial end portions of the nonmagnetic electrically conductive material comprises a nonmagnetic electrically conductive ring.

13. A dynamo as claimed in claim 12 comprising second bars of nonmagnetic electrically conductive material extending radially inwards of and parallel to the first said bars, said second bars being electrically connected to said radial end portions.

14. A dynamo as claimed in claim 1 constructed as a DC machine in which only said series wound radial loop windings are provided and the cylindrical member on which said windings are wound is free of interpole, compensating and equalizing windings.

15. A dynamo as claimed in claim 14 wherein said radial loop windings are wound on either the rotor or stator.

* * * * *